United States Patent
Bellville

(10) Patent No.: US 9,164,501 B2
(45) Date of Patent: Oct. 20, 2015

(54) METHODS AND APPARATUS TO MANAGE DATA UPLOADING IN A PROCESS CONTROL ENVIRONMENT

(75) Inventor: Keith R. Bellville, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 574 days.

(21) Appl. No.: 12/573,603

(22) Filed: Oct. 5, 2009

(65) Prior Publication Data

US 2011/0082569 A1      Apr. 7, 2011

(51) Int. Cl.
*G06F 17/30* (2006.01)
*G05B 19/042* (2006.01)

(52) U.S. Cl.
CPC ...... *G05B 19/0426* (2013.01); *G06F 17/30312* (2013.01); *G05B 2219/23302* (2013.01); *G05B 2219/24168* (2013.01); *G06F 17/30002* (2013.01)

(58) Field of Classification Search
CPC ............ H04L 63/1416; H04L 12/2602; H04L 2012/4026; H04L 43/00; G06F 8/20; G06F 8/38; G06F 17/2247; G06F 17/3089; G06F 21/552; G05B 19/04
USPC ............. 707/1, 100, 781, 600, 601, 602, 687, 707/694, 703, 782, 783, 785, 78; 700/21, 700/79
See application file for complete search history.

(56) References Cited

U.S. PATENT DOCUMENTS

| | | | |
|---|---|---|---|
| 5,446,903 A | 8/1995 | Abraham et al. | |
| 6,421,571 B1 * | 7/2002 | Spriggs et al. | 700/17 |
| 6,571,285 B1 | 5/2003 | Groath et al. | |
| 6,633,782 B1 | 10/2003 | Schleiss et al. | |
| 6,801,920 B1 | 10/2004 | Wischinski | |
| 6,813,532 B2 | 11/2004 | Eryurek et al. | |
| 6,901,560 B1 | 5/2005 | Guerlain et al. | |
| 6,965,806 B2 | 11/2005 | Eryurek et al. | |
| 6,985,779 B2 | 1/2006 | Hsiung et al. | |

(Continued)

FOREIGN PATENT DOCUMENTS

| | | |
|---|---|---|
| DE | 102008010864 | 8/2009 |
| EP | 1868055 | 12/2007 |

(Continued)

OTHER PUBLICATIONS

United States Patent and Trademark Office, Office Action issued for U.S. Appl. No. 11/465,036, mailed on Jun. 15, 2009, 16 pages.

(Continued)

*Primary Examiner* — Jay Morrison
*Assistant Examiner* — Dangelino Gortayo
(74) *Attorney, Agent, or Firm* — Hanley, Flight & Zimmerman, LLC

(57) ABSTRACT

Example methods and apparatus to manage data uploading in a process control environment are disclosed. A disclosed example method includes receiving a request to upload a parameter value associated with a process control system and retrieving an upload rule profile associated with the process control system. The example method also includes identifying an upload action from the upload rule profile based on the parameter value and a personnel classification, and determining whether to upload the parameter value based on the upload action.

22 Claims, 11 Drawing Sheets

(56) References Cited

U.S. PATENT DOCUMENTS

| | | | |
|---|---|---|---|
| 7,020,875 B2 | 3/2006 | Zweifel et al. | |
| 7,117,040 B2 | 10/2006 | Masuda et al. | |
| 7,130,701 B1 | 10/2006 | Wischinski | |
| 7,203,560 B1 | 4/2007 | Wylie et al. | |
| 7,239,977 B2 | 7/2007 | Fantana et al. | |
| 7,328,078 B2 | 2/2008 | Sanford et al. | |
| 7,330,768 B2* | 2/2008 | Scott et al. | 700/79 |
| 7,346,404 B2 | 3/2008 | Eryurek et al. | |
| 7,614,083 B2* | 11/2009 | Khuti et al. | 726/22 |
| 7,698,242 B2* | 4/2010 | Van Camp et al. | 706/45 |
| 7,831,704 B2* | 11/2010 | Schachtely et al. | 709/224 |
| 7,894,087 B2* | 2/2011 | Abiko | 358/1.14 |
| 7,957,936 B2* | 6/2011 | Eryurek et al. | 702/188 |
| 7,962,229 B2* | 6/2011 | Bromley et al. | 700/83 |
| 8,000,814 B2* | 8/2011 | Havekost et al. | 700/17 |
| 8,074,278 B2* | 12/2011 | Law et al. | 726/23 |
| 8,112,170 B2* | 2/2012 | Pfeiffer et al. | 700/110 |
| 8,276,186 B2* | 9/2012 | DeFord et al. | 726/2 |
| 8,291,473 B2* | 10/2012 | Choudhury et al. | 726/3 |
| 8,380,975 B2* | 2/2013 | DiStefano et al. | 713/100 |
| 8,607,312 B2 | 12/2013 | Shioyama et al. | |
| 2002/0046221 A1 | 4/2002 | Wallace et al. | |
| 2002/0163427 A1 | 11/2002 | Eryurek et al. | |
| 2002/0174264 A1 | 11/2002 | Fuller et al. | |
| 2004/0153412 A1 | 8/2004 | Fischer et al. | |
| 2004/0186927 A1 | 9/2004 | Eryurek et al. | |
| 2004/0213384 A1 | 10/2004 | Alles et al. | |
| 2004/0230594 A1* | 11/2004 | Flam et al. | 707/100 |
| 2005/0010323 A1 | 1/2005 | Cocciadiferro et al. | |
| 2005/0033866 A1 | 2/2005 | Besson et al. | |
| 2006/0101457 A1 | 5/2006 | Zweifel et al. | |
| 2007/0143450 A1 | 6/2007 | Kruse et al. | |
| 2007/0244584 A1 | 10/2007 | John et al. | |
| 2010/0185857 A1* | 7/2010 | Neitzel et al. | 713/168 |
| 2011/0004685 A1 | 1/2011 | De Groot et al. | |

FOREIGN PATENT DOCUMENTS

| | | |
|---|---|---|
| GB | 2414568 | 11/2005 |
| JP | H05-46883 | 2/1993 |
| JP | H09247765 | 9/1997 |
| JP | 2002268707 | 9/2002 |
| WO | 02079884 | 10/2002 |
| WO | 03075206 | 9/2003 |
| WO | 2008096792 | 8/2008 |

OTHER PUBLICATIONS

United Kingdom Intellectual Property Office, Search Report Under Section 15(5) issued for UK patent application No. GB0715422.2, issued on Nov. 8, 2007, 3 pages.

United States Patent and Trademark Office, Notice of Allowance papers issued for U.S. Appl. No. 11/465,036, mailed on Nov. 19, 2009, 36 pages.

United Kingdom Intellectual Property Office, Search Report issued in GB1016676.7, date of search Feb. 14, 2011, 2 pages.

Japanese Patent Office, "Notice of Reasons for Rejection," issued in connection with application No. JP 2010-224723, mailed on Jul. 8, 2014, 6 pages.

State Intellectual Property Office of China, "First Office Action," issued in connection with application No. CN 201010572420.9, mailed on Apr. 30, 2014, 11 pages.

Intellectual Property Office of Great Britain, "Examination Report," issued in connection with application No. GB 1016676.7, on Jun. 17, 2014, 4 pages.

Japanese Patent Office, "Decision of Refusal" issued in connection with application No. 2010-224723, on Jun. 9, 2015, 6 pages (with English translation).

\* cited by examiner

400

| CONDITIONAL PARAMETERS: | TC1-HI-ALM — 402 | | | |
|---|---|---|---|---|
| | | 412 | 414 | |
| | UPPER THRESHOLD | UNITS | ACTION | NOTIFY? |
| 404 | 98 | °C | Deny if Above | ☑ — 416 |
| 406 | INTERMEDIATE THRESHOLD #1 90 | °C | Allow if Above | ☑ — 416 |
| 408 | INTERMEDIATE THRESHOLD #2 80 | °C | Allow if Below | ☐ — 416 |
| 410 | LOWER THRESHOLD 72 | °C | Deny if Below | ☑ — 416 |

| | 418 | 420 |
|---|---|---|
| 422 | CONTACT INFORMATION | MESSAGE |
| CONTACT ENTITY #1 | 8475203633 | Plant_A adjustment attampt @ TC1 |
| CONTACT ENTITY #1 424 | 2625426609 | Confirm adjustment of TC1 |

Exit without changes — 426
Save & Exit — 428

FIG. 4

RUNTIME DATABASE PARAMETER CHANGES SINCE AUG. 17, 2009 — 520

Prompt Request List - Enable check-box to allow upload from runtime database to configuration database.

| 522 ENABLE? | 524 PARAMETER | PREVIOUS RUNTIME VALUE 526 | CURRENT VALUE 528 |
|---|---|---|---|
| ☑ | ... | ... | ... |
| ☑ | ... | ... | ... |
| ☐ | ... | ... | ... |
| ☑ | ... | ... | ... |
| . | . | . | . |
| . | . | . | . |
| . | . | . | . |

[Select All — 530]  [Deselect All — 532]  [Apply — 534]

RUNTIME DATABASE PARAMETER CHANGES SINCE AUG. 17, 2009

List of all changes with default actions shown per active profile. Enable/
Disable check-boxes to allow/disallow parameter value upload action.

| 538 ENABLE? | 540 PARAMETER | PREVIOUS 542 RUNTIME VALUE | 544 CURRENT VALUE | 546 CHANGE AUTH. BY | 548 DATE CHANGED |
|---|---|---|---|---|---|
| ☑ | ... | ... | ... | ... | ... |
| ☑ | ... | ... | ... | ... | ... |
| ☐ | ... | ... | ... | ... | ... |
| ☑ | ... | ... | ... | ... | ... |

Select All — 550   Deselect All — 552   Apply — 554

FIG. 5C

METHODS AND APPARATUS TO MANAGE DATA UPLOADING IN A PROCESS CONTROL ENVIRONMENT

FIELD OF THE DISCLOSURE

The present disclosure relates generally to process control systems and, more particularly, to methods and apparatus to manage data uploading in a process control environment.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, vessels, tanks, switches and transmitters (e.g., temperature, pressure and flow rate sensors), perform functions within the process such as opening or closing valves, raising/lowering temperatures and/or pressures, and measuring process parameters. The process controller receives signals indicative of process measurements made by the field devices and/or other information pertaining to the field devices, uses this information to implement a control routine, and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Process control system applications typically include process control routines that can be configured to perform various functions or operations in a process control system. For example, process control routines may be used to control valves, motors, boilers, heaters, and/or other devices that allow a product (e.g., petroleum, cosmetics, food, etc.) to be produced. The manufactured product may be dependent upon proper process control routine functionality, and/or may require tuning/alteration in an effort to bring product specifications within acceptable tolerances (e.g., chemical composition percentages, product viscosity, etc.).

Process control routines may also be used to monitor field devices, modules, plant areas, etc. and collect information associated with a process control system. Field devices used to implement the process control routines are typically coupled to one another and to a process controller via a data bus. In an effort to verify that the process control routines operate in a manner that maintains acceptable product tolerances, product batch parameters may be measured and saved during manufacture of the product. Control operators, plant managers, configuration personnel, maintenance personnel, engineers and/or other individuals responsible to maintain acceptable product quality may access one or more databases that store parameters associated with a product batch and/or any other manufacturing, measurement and/or research process. Accordingly, a relatively large number of personnel may have access to parameters used by the process control system, such as parameters related to temperature set points, alarm limits, time set points, proportional-integral-derivative (PID) set points, etc.

Process control systems typically include a runtime database to store parameter values. Upon a parameter value change by a user of the process control system, such as an alarm limit change, the runtime database stores the new parameter value. On a periodic, manual and/or scheduled basis, a configuration database is updated to reflect parameter values for the process control system and/or other process control systems that may also be connected to a larger networked manufacturing plant(s). Prior to the configuration database update, personnel having relatively high authority over the process control system typically verify that the data to be uploaded during the update is correct, authorized and/or within proper safety settings.

SUMMARY

Example apparatus and methods to manage data uploading in a process control system are described. An example method includes receiving a request to upload a parameter value associated with a process control system and retrieving an upload rule profile associated with the process control system. The example method also includes identifying an upload action from the upload rule profile based on the parameter value and a personnel classification, and determining whether to upload the parameter value based on the upload action.

In accordance with another example, an example apparatus includes an upload manager to receive a request to upload a parameter value associated with a process control system and a database change monitor to identify a change in the parameter value. The disclosed example apparatus also includes a profile manager to retrieve an upload rule profile associated with the process control system and to select an upload action from the upload rule profile based on the parameter value and a personnel classification.

BRIEF DESCRIPTION OF THE DRAWINGS

FIGS. 3 and 4 depict example user interface (UI) representations of profile configurations.

FIGS. 5A, 5B and 5C depict example UI representations of upload action review activities.

DETAILED DESCRIPTION

Figure 1:
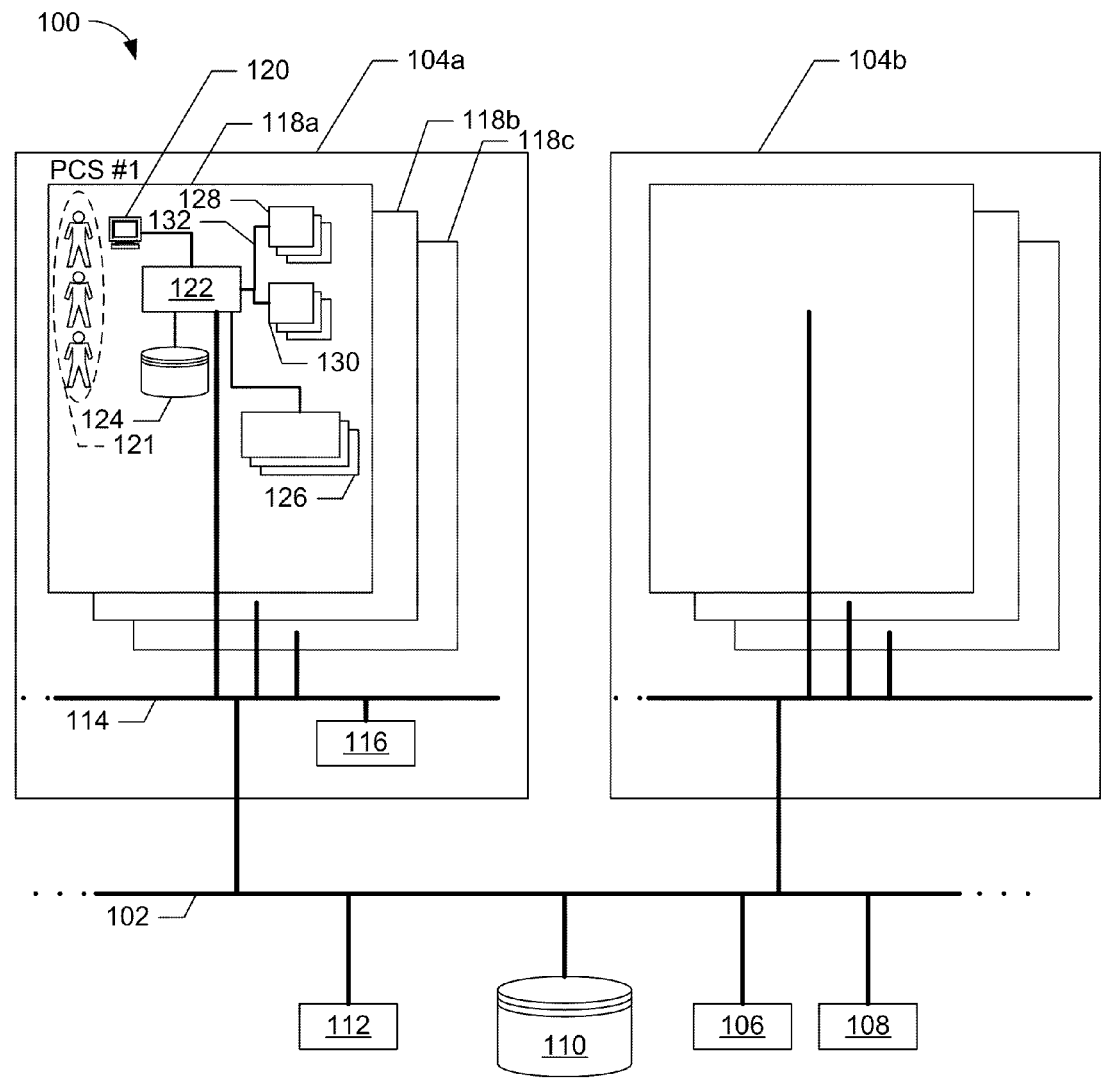
FIG. 1 is a block diagram of an example process control environment to be used when managing data uploading.

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, the examples provided are not the only way to implement such methods and apparatus.

Process control systems may be implemented on any scale, such as a relatively small process control system having a few input/output (I/O) nodes, or a relatively large number of process control systems operated in geographically disparate locations having I/O nodes, pump controls/sensors, valve controls/sensors, alarms, etc. Each process control system typically has a controller, such as a DeltaV™ controller sold by Fisher-Rosemount Systems, Inc., an Emerson Process Management™ company. The controller may retrieve instructions to execute one or more processes from a runtime database, such as one or more modules containing process function blocks. In the event that one or more process control systems, controllers and/or modules become damaged or corrupted, the configuration database may be used to restore a new and/or repaired process control system with proper parameter values and/or other data to control and/or execute one or more process control functions (e.g., equipment setpoints, PID settings, alarm limits, etc.).

The configuration database, which is usually a global data store that is common and/or accessible to any number of process control systems within a process control environment, may allow parameter and/or parameter value restoration for one or more process control systems that have been damaged, corrupted, deleted, duplicated, etc. However, if the configuration database is populated with incorrect parameter values, propagating such incorrect parameter values to the process control system may cause manufacturing problems, such as product defects, raw material waste and/or increased safety risks. For example, a maintenance employee may have access to a workstation that is communicatively connected to a local process control system within a plant. While the maintenance employee may have authorization to access the workstation so that one or more processes can be deactivated to allow, for example, part replacement activities, the maintenance employee may not necessarily understand which parameter values are appropriate for the replacement part(s). As a result, improper parameter values set by the maintenance employee may cause one or more manufacturing problems when the process control system executes. More significantly, improper parameter values set by the maintenance employee may cause one or more safety risks (e.g., a temperature alarm setpoint set too high).

The configuration database (e.g., global data store) may be updated on a periodic, aperiodic, scheduled and/or manual basis to back-up parameter values in a local data store, such as a runtime database. Frequently updating the configuration database minimizes laborious reconfiguration tasks that may be associated with repairing a damaged process control system. Prior to updating the configuration database, a configuration engineer (e.g., a person having requisite authorization, training and/or knowledge of the process control systems and/or safety issues associated with parameter settings/values) may review differences between the runtime database and the configuration database. In the event that a relatively long period of time elapses before the configuration engineer can review desired parameter upload change candidates for the configuration database, the corresponding number of potential changes can become relatively large.

Large numbers of parameter value changes may be tedious and/or exhausting for one or more personnel responsible to maintain the integrity of the configuration database (e.g., the configuration engineer). Maintaining the integrity of the configuration database is particularly important. As a result, the configuration engineer must typically review each change initiated by maintenance personnel, engineers, operators and/or any other personnel initiated change to the runtime database to verify that the change is appropriate or acceptable. Whether changes to the parameter values are appropriate or acceptable may be determined based on, for example, knowledge of proper batch chemical concentrations, proper batch temperatures, proper pressure safety limits and/or independently operating plant safety systems that may respond to one or more alarm thresholds. Without limitation, safety parameters may be further dictated by federal law, state law and/or local ordinances. As such, the configuration engineer may need to approve or disapprove of hundreds, thousands, or any other number of parameter upload change candidates made by various types of personnel (e.g., maintenance personnel, configuration engineers, safety engineers, etc.).

The methods and apparatus described herein facilitate, in part, configuration database upload management in a manner that minimizes a number of individual parameter change approval and/or denial activities by the configuration engineer or other responsible personnel. As explained in further detail below, in the event one or more parameter value changes are initiated by maintenance personnel, engineers and/or operators, the methods and apparatus described herein may compare or evaluate such changes in view of personnel authorization privileges and/or parameter threshold settings. Personnel authorization privileges and/or parameter threshold settings may, for example, be defined in an upload rule profile. As a result, approval to upload parameter value changes from one or more runtime databases to the configuration database may occur without tedious review by the configuration engineer and, instead, may occur automatically based on one or more rules and/or limits established by an active upload rule profile. Similarly, decisions to deny one or more parameter upload change candidates from runtime databases to the configuration database may occur based on the active upload rule profile.

Now turning to FIG. 1, an example process control environment 100 that may be employed to implement the example methods and apparatus described herein includes an intra-plant bus 102 to facilitate communication between geographically separated manufacturing plants 104a and 104b (plants A and B, respectively). While the illustrated example of FIG. 1 includes two manufacturing plants, any number of manufacturing plants may employ the example methods and apparatus described herein. For purposes of explanation, and not limitation, the manufacturing plant 104a will be described below. Further, while the illustrated example of FIG. 1 includes the manufacturing plants 104a and 104b, the example methods and apparatus described herein may be employed in any environment in which process control systems, data collection systems and/or test and measurement (T&M) systems are employed.

The intra-plant bus 102 may use any suitable local area network (LAN) or wide area network (WAN) protocol, one or more intranets and/or the Internet to facilitate communication between one or more devices of the process control environment 100. The process control environment 100 also includes any number of business, control and/or maintenance systems. Business and/or maintenance systems may execute, for example, enterprise resource planning (ERP), material resource planning (MRP), accounting, production and customer ordering systems. The intra-plant bus 102 also facilitates communication between a corporate WAN 106, one or more remote monitoring computer systems 108, a configuration database 110 and/or an upload manager 112.

The example plant 104a represents an example manufacturing plant that may produce one or more products during one or more batch processes and/or batch phases. Without limitation, the example plant 104a may represent an assembly line/process, one or more audit station tests, laboratory test processes and/or general T&M activities. The example plant 104a includes a plant bus 114 to facilitate communication with the intra-plant bus 102 and one or more devices/systems of the plant 104a. The example plant 104a also includes a workstation 116 to serve as an operator interface for the plant 104a. The workstation 116 may be communicatively connected to one or more process control systems 118a-c (process control systems #1, #2 and #3, respectively) via the plant bus 114. Each of the example process control systems (PCSs) 118a-c includes a workstation 120, a controller 122, a runtime database 124, one or more modules 126, one or more input/output (I/O) devices 128, and one or more field devices 130. The example workstation 120 may be configured to perform operations associated with one or more applications, user-interactive applications (e.g., operator prompts to advance batch operations, assembly operations, T&M operations, etc.), communication applications and/or one or more function blocks within the modules 126. For example, the workstation 120 may be configured to perform operations associated with process control-related applications and communication applications that enable the workstation 120 and the controller 122 to communicate with other devices and/or systems using any communication media (e.g., wireless, hardwired, etc.) and protocols (e.g., HTTP, SOAP, GP-IB, SCPI, etc.). One or more personnel 121 may use the example workstation 120 in a manner consistent with, for example, their job description. Without limitation, example personnel 121 that may use the example workstation 120 include a configuration engineer, a systems engineer and/or maintenance personnel. The workstation 120 may be implemented using any suitable computer system or processing system (e.g., the processor system P100 of FIG. 8). For example, the workstation 120 could be implemented using a single processor personal computer, a single or multi-processor workstation(s), etc.

The controller 122 may perform one or more process control routines that have been configured and/or designed by a plant manager, a process-control engineer, a system engineer, a configuration engineer and/or any other personnel 121 responsible for operation of Plant_A 104a, the Plant_B 104b and/or the entire process control environment 100. The controller 122 may be, for example, a DeltaV™ controller sold by Fisher-Rosemount Systems, Inc., an Emerson Process Management™ company. However, any other controller could be used instead. Further, while only one controller is shown in FIG. 1, additional controllers of any type or combination of types may be coupled to the plant bus 114.

The controller 122 may be coupled to any number of field device(s) 130 via a controller bus 132 and the I/O device 128. During execution of a process control routine, the controller 122 may exchange information (e.g., commands, configuration information, measurement information, status information, etc.) with the field devices 130. For example, the controller 122 may be provided with a process control routine that, when executed by the controller 122, causes the controller 122 to send commands to the field devices 130 that cause the field devices 130 to perform specified operations (e.g., perform a measurement, open/close a valve, turn on/off a process pump, etc.) and/or to communicate information (e.g., measurement data) via the controller bus 132.

In the illustrated example of FIG. 1, the field devices 130 are Fieldbus™ compliant devices configured to communicate via the controller bus 132 using a Fieldbus™ protocol. However, the methods and apparatus described herein are not limited to the Fieldbus™ protocol and/or Fieldbus™ devices. Rather, field devices may include, without limitation, Profibus™ devices and/or HART-compliant devices that communicate via the controller bus 132 via Profibus™ and/or HART protocol(s).

The example PCS #1 118a is provided to illustrate one type of system within which the example methods and apparatus described in greater detail below may be advantageously employed. However, the example methods and apparatus described herein may, without limitation, be advantageously employed in other systems of greater or less complexity than the example PCS #1 118a shown in FIG. 1.

In the illustrated example of FIG. 1, the modules 126 are configured at the workstation 120 to define a process control routine to be executed by the controller 122 and/or the field devices 130. Additionally or alternatively, the modules 126 and/or one or more function blocks contained therein may be obtained from the example runtime database 124 and/or the configuration database 110. For example, in the event that the runtime database 124 has been corrupted, information related to modules and function blocks may be retrieved from the configuration database 110. The modules 126 include any number of function blocks that define functions to be performed by the field devices 130 to implement the process control routine (e.g., a batch process, a phase of the batch process, a plurality of batch process phases to make a product, etc.). The function blocks may cause the field devices 130 to acquire measurement values (e.g., pressure values, temperature values, flow values, voltage values, current values, etc.), perform algorithms or calculations (e.g., integrations, derivatives, additions, subtractions, etc.), control instrumentation (e.g., opening/closing valves, furnace adjustments, boiler adjustments, etc.), and/or to perform any other function(s).

The workstation 120 may also be used to configure other modules having one or more other function blocks executed by the field devices 130 and/or the controller 122. Although multiple modules 126 are shown, a greater or lesser number of modules may be configured at the workstation 120 (e.g., configured by a plant manager, configuration engineer, etc.) having additional function blocks to be executed by the controller 122 and/or the field devices 130. The other module(s) may be used to implement other process control routines (e.g., new process control routines related to alternate/additional product batches) and/or to implement a process control routine in connection with the modules 126. Additionally, the example PCS #1 118a described above may be similar to other PCSs (e.g., 118b, 118c) within the Plant_A 104a, and Plant_A 104a may be representative of additional plants (e.g., Plant_B 104b, etc.) within the example process control environment 100.

Generally speaking, the example runtime database 124 stores measurement data and parameter values associated with one or more process control operations of the PCS 118a. The modules 126 initially define a set of operating parameter values for a given control process, and any changes to the parameter values made by personnel 121 are stored in the runtime database 124 with a date and/or time stamp to identify when parameter value changes to a process were made. Additionally, information related to the identity of the personnel 121 responsible for the changed parameter values may be stored in the example runtime database 124. For example, maintenance personnel 121 may access the workstation 120 during non-production shifts to alter one or more alarm limits in an effort to confirm that one or more safety backup systems are functioning properly (e.g., pump/heater power disconnects in response to detected runaway conditions).

While the maintenance personnel 121 may have appropriate authorization to make such temporary adjustments to one or more parameter values, the maintenance personnel 121 typically return changed parameter values back to original values in a manner that does not interfere with proper PCS operation(s). Even if the original values are not restored and batch production is not adversely affected, potential safety issues may remain. Moreover, in the event that such improper parameter values are uploaded to the example configuration database 110, then those improper parameter values can potentially propagate to other PCSs (e.g., PCS #2 118b, PCS #3 118c, PCSs in Plant_B 104b, etc.) if and when the configuration database 110 provides backup services to other PCSs in the process control environment 100.

To minimize propagation of incorrect parameter values, review of parameter upload change candidates is typically performed by the configuration engineer prior to one or more parameter value uploads from the runtime database 124 to the configuration database 110. However, in some instances the configuration engineer may experience fatigue and/or time constraints when a relatively substantial number of changes must be reviewed. One or more effects from such fatigue and/or time constraints include, but are not limited to, accidentally allowing improper parameter values to be stored from the runtime database 124 to the configuration database 110, allowing improper parameter value uploads without thorough manual review, and/or failing to allow parameter value uploads from the runtime database 124 to the configuration database 110.

In operation, the example upload manager 112 compares an upload rule profile to the runtime database 124 to identify which parameter value change candidates should be uploaded to the configuration database 110, which parameter value change candidates should not be uploaded to the configuration database 110, which parameter value change candidates require further consideration before uploading to the configuration database 110 and/or which parameter value change candidates trigger conditional action(s). The example upload manager 112 may employ any number of rule profiles, which may be used to identify an upload action associated with a personnel type. For example, an upload rule profile may identify that parameter value changes initiated by maintenance personnel should never be uploaded (deny upload) to the configuration database 110, while parameter value changes initiated by safety engineers should always be uploaded (allow upload) to the configuration database 110. In another example, an upload rule profile may identify that any upload action initiated by an engineer should be reviewed by the configuration engineer (or any other personnel having requisite authority to allow changes to the configuration database 110) before being uploaded (prompt for review) to the configuration database 110. At least one effect of the methods and apparatus described herein is to minimize and/or eliminate tedious upload review authorization activities by the configuration engineer and/or to minimize review-related errors.

Figure 2:
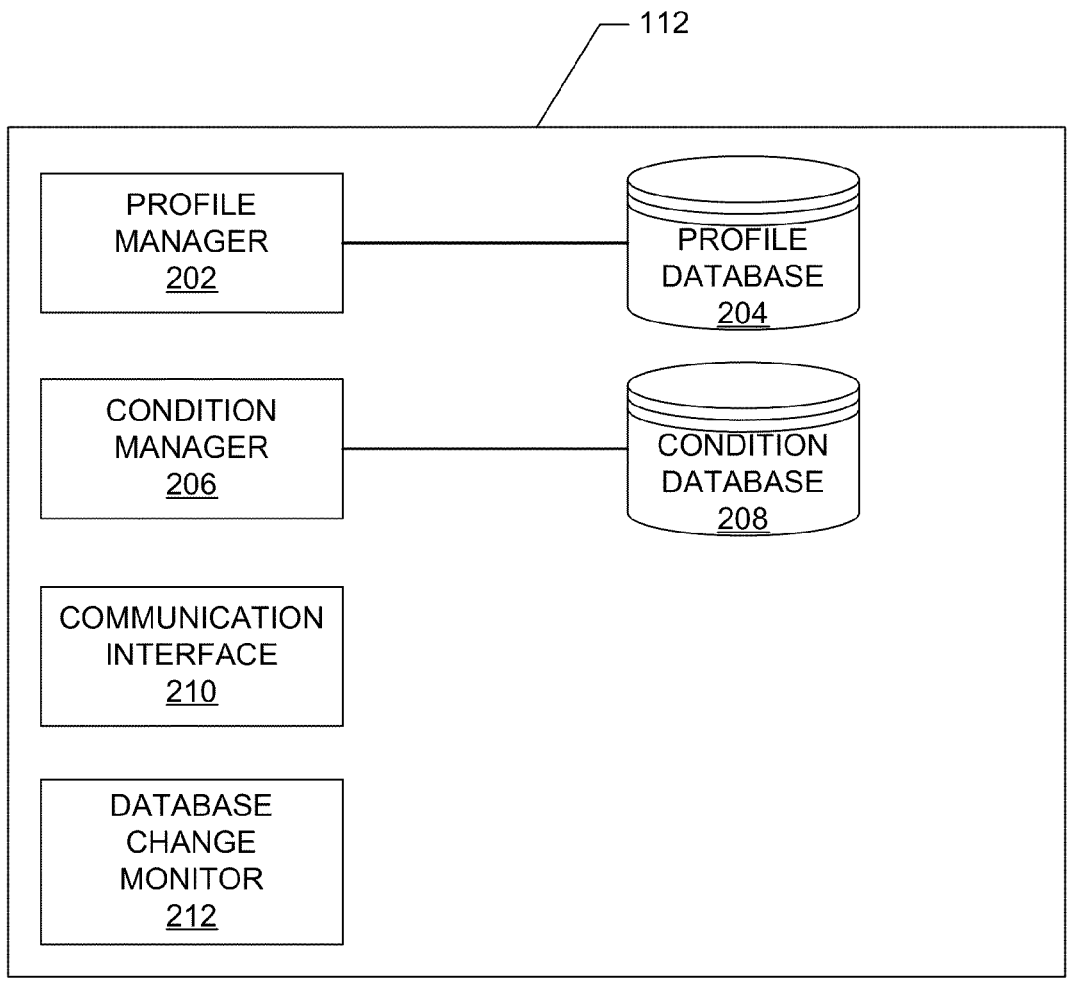
FIG. 2 is a block diagram of an example upload manager shown in FIG. 1.

In the illustrated example of FIG. 2, the upload manager 112 includes a profile manager 202, a profile database 204 communicatively connected to the profile manager 202, a condition manager 206, and a condition database 208 communicatively connected to the condition manager 206. Additionally, the example upload manager 112 of FIG. 2 includes a communication interface 210 and a database change monitor 212. The example profile manager 202 receives a request to load a preconfigured profile stored in the profile database 204, receives a request to store a tailored profile in the profile database 204 for future use, and/or receives a request to apply a profile to changed parameter values before authorizing or denying an upload operation to the example configuration database 110.

Upload actions may include, but are not limited to an action to allow the upload of parameter values, deny the upload of parameter values, prompt for review prior to allowing or denying an upload action, and a conditional upload action. As described above, the personnel 121 that interact with the process control environment 100 may be associated with an upload action to always allow the upload of parameter values in the event that such parameter values stored on the runtime database 124 differ from parameter values stored on the configuration database 110. The upload action to always allow an upload operation may be most appropriate in connection with PCS personnel responsible for plant safety and/or quality control. On the other hand, the action to always deny an upload operation may be most appropriate in connection with PCS personnel having less familiarity and/or technical knowledge of the PCS. For example, while maintenance personnel may exhibit superior skills and/or knowledge associated with electrical plant schematics, wiring and/or power distribution, such maintenance personnel may not have the necessary training and/or experience to properly set parameter values in a manner that complies with safety regulations (e.g., one or more regulations mandated by the Occupational Health and Safety Administration (OSHA)).

Conditional upload actions include allowing or denying an upload operation based on, in part, one or more threshold limits associated with the changed parameter value of interest. As described in further detail below, an upload profile may cause the example upload manager 112 to upload a parameter value to the configuration database 110 if it is changed within one or more threshold limits. Additionally, the example condition manager 206 may compare the changed parameter values to one or more threshold values stored in the example condition database 208. In some instances, one or more intermediate thresholds may be established by the upload profile, in which case a notification message is provided to a contact entity. For example, if an engineer changes a parameter value such that it resides within an intermediate range, then the example communication interface 210 may invoke one or more modes of communication to notify one or more contact entities, such as personnel accessible via wireless telephone, text messaging, voice-mail and/or e-mail.

The example database change monitor 212 identifies one or more differences between a parameter value stored in a runtime database (e.g., the runtime database 124 in the PCS #1 118a) and the configuration database 110. While the configuration engineer may manually invoke the example upload manager 112 to upload data and/or parameters in accordance with an upload profile, the example database change monitor 212 may automatically employ one or more upload profiles (and their corresponding settings) on a scheduled, periodic and/or aperiodic basis. In the event that the example database change monitor 212 identifies a difference between the runtime database 124 and the configuration database 110 (i.e., an indication that one or more parameter values have been changed), the database change monitor 212 forwards an indication of the changed parameter value as a change candidate to the example profile manager 202 so that it can be compared to one or more upload rule profiles.

Figure 3:
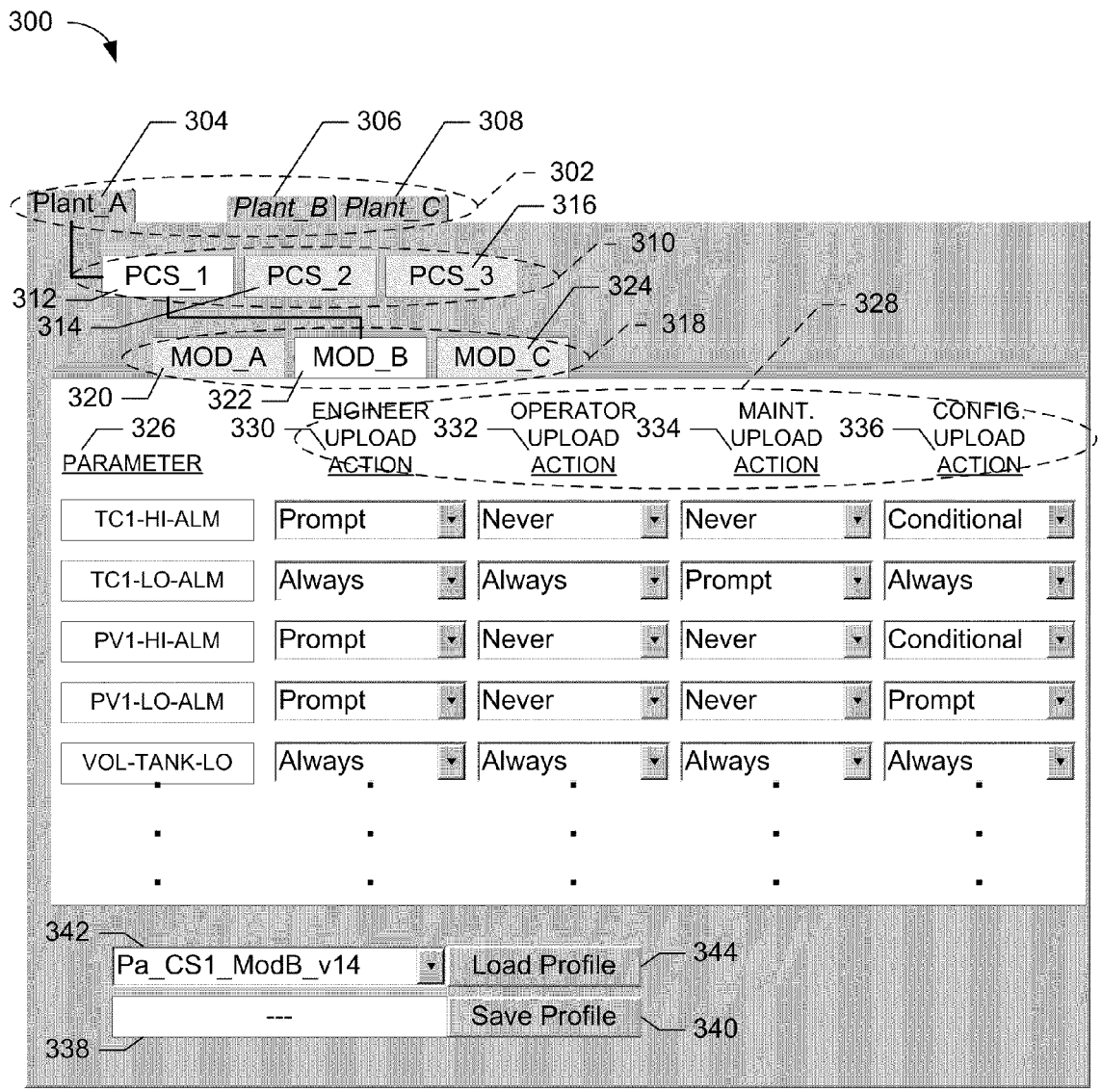

FIG. 3 illustrates an example profile setup user interface 300. In the illustrated example of FIG. 3, the profile setup user interface (UI) 300 includes a primary-level hierarchical control system representation 302, which includes a Plant_A tab 304, a Plant_B tab 306 and a Plant_C tab 308 to allow a user (e.g., the configuration engineer) of the UI 300 to select which manufacturing plant to edit and/or review. While the illustrated example UI 300 of FIG. 3 shows three plant tabs (i.e., Plant_A 304, Plant_B 306, and Plant_C 308), any number and/or type of plant, factory and/or laboratory may be represented by one or more primary-level hierarchical representations 302.

The example UI 300 of FIG. 3 also includes a secondary-level hierarchical control system representation 310 that corresponds to a selected manufacturing plant from the primary-level hierarchical representation 302. The example secondary-level hierarchical control system representation 310 includes a first PCS tab (PCS_1) 312, a second PCS tab (PCS_2) 314 and a third PCS tab (PCS_3) 316 to allow a user of the UI 300 to select one of the individual PCSs of a previously selected manufacturing plant for reviewing and/or editing purposes. While the illustrated example UI 300 of FIG. 3 shows three example PCS tabs (i.e., PCS_1 312, PCS_2 314 and PCS_3 316), any number and/or type of PCS may be represented by one or more tabs of the secondary-level hierarchical representations 310. For example, each manufacturing plant (e.g., factory, laboratory, product test facility, etc.) may include any number of PCS stations dedicated to one aspect of plant operation.

The example UI 300 of FIG. 3 also includes a tertiary-level hierarchical module representation 318 that corresponds to a selected PCS from the secondary-level hierarchical control system representation 310. The example tertiary-level hierarchical module representations 318 includes a first module (Module_A) 320, a second module (Module_B) 322 and a third module (Module_C) 324 one or more of which the user of the UI 300 may select for further editing and/or reviewing. While the illustrated example UI 300 of FIG. 3 shows three example modules (i.e., Module_A 320, Module_B 322 and Module_C 324), any number of modules may be represented by one or more tabs of the tertiary-level hierarchical representations 318. For example, each PCS may include any number of modules to specify control system instructions, operating parameters and/or alarm limits.

Although the example UI 300 of FIG. 3 illustrates three hierarchical levels (i.e., the primary-level 302, the secondary-level 310 and the tertiary-level 318) based on manufacturing plants, corresponding PCSs and corresponding modules, more or fewer hierarchical levels may be used. For example, some process control environments may include additional and/or alternate hierarchical subdivisions including, but not limited to product-related hierarchical levels, geographic-related hierarchical levels, shift-related hierarchical levels and/or schedule-related hierarchical levels. The hierarchical levels of the example UI 300 of FIG. 3 enable a user to focus on logical subgroupings within the process control environment, such as the example process control environment 100 of FIG. 1.

In operation, the user may begin by selecting one of the tabs from the primary-level representation(s) 302 to expose details related to one of the manufacturing plants, such as the example Plant_A tab 304. Upon selecting the Plant_A tab 304, the example UI 300 identifies the secondary-level representation(s) 310, including any number of tabs related thereto (e.g., the PCS_1 tab 312, the PCS_2 tab 314, etc.). Upon selecting, for example, the PCS_1 tab 312, the example UI 300 identifies the tertiary-level representation(s) 318 including one or more module tabs, such as the example Module_A tab 320, the example Module_B tab 322 and the example Module_C tab 324.

In the event that the example Module_B tab 322 is selected, the example UI 300 displays one or more fields to allow an upload rule profile to be viewed and/or edited. As described above, parameters of a PCS include associated values that may be set for any number of different objectives. For example, parameter values may be set in view of process performance settings (e.g., temperature set points, PID values, pump timers, flow control valves, etc.), alarm limits (e.g., alarms related to approaching temperature thresholds, pressure thresholds, volume level thresholds, etc.) and/or safety limits (e.g., automatic shut-down safety procedures to stop run-away conditions).

In the illustrated example of FIG. 3, the UI 300 includes a parameter column 326, and columns associated with personnel types 328. The example personnel types 328 of FIG. 3 include an engineer upload action column 330, an operator upload action column 332, a maintenance upload action column 334 and a configuration engineer upload action column 336. While the illustrated example UI 300 of FIG. 3 includes four example personnel types, any number of additional and/or alternate personnel types may be employed without limitation. The example parameter column 326 may include any number of parameters, in which each parameter row is associated with a corresponding third-level hierarchical tab 318, such as the example selected Module_B tab 322. Each parameter row in the example parameter column 326 intersects one or more personnel types 328 at a corresponding column and includes an action drop-down box. Each action drop-down box may include, but is not limited to an Always-Upload action to associate the personnel and/or personnel type with an always-allow privilege, a Never-Upload action to associate the personnel and/or personnel type with a never-allow privilege, a Prompt action to associate the personnel and/or personnel type with a further request to invoke a prompt request for approval to upload (e.g., approval from the configuration engineer), or a Conditional action to associate the personnel and/or personnel type with a conditional-allow privilege.

In operation, if a parameter of interest is assigned an Always-Upload action, then any changes to the parameter of interest made by the corresponding personnel will be uploaded automatically from the runtime database 124 to the configuration database 110 when the configuration engineer initiates an upload operation (and/or when an upload operation initiates on a periodic, aperiodic or scheduled basis), thereby reducing an amount of individual parameter value review tasks prior to permitting the parameter value to be uploaded to the configuration database 110. An assignment of the Always-Upload action is typically associated with personnel and/or personnel types that have an intimate knowledge, significant experience and/or significant training with respect to the corresponding module, PCS and/or plant. On the other hand, if a parameter of interest is assigned the Never-Upload action, then any changes to the parameter of interest made by the corresponding personnel will not be uploaded from the runtime database 124 to the configuration database 110 when the configuration engineer initiates an upload process. In this case, the personnel assigned the Never-Upload action is not deemed to have a sufficient knowledge, experience and/or training related to the process control environment 100 to warrant authorization to change one or more parameter values in the configuration database. To that end, any changes that may have been properly applied by such personnel during their interaction with a process control system (e.g., a maintenance equipment installation) will not be reflected in the configuration database 110.

An assignment of the Prompt action in an action drop-down box flags any parameter value changes to undergo further review by the configuration engineer before making any decision on whether or not to upload the parameter value to the configuration database. The Prompt action assignment may be appropriate when the parameter of interest is particularly important, even when the personnel making a parameter value change are believed to have sufficient knowledge, experience and/or training. For example, parameters related to safety temperature, pressure and/or process speed controls may be deemed particularly significant and worthy of double-checking by the configuration engineer prior to allowing such changed values to be uploaded to the configuration database.

An assignment of the Conditional action in an action drop-down box flags any parameter value changes to undergo a comparison to one or more threshold limits before making any determination of whether to save changed parameter values to the configuration database. As described in further detail below, the Conditional action causes the parameter value made by the personnel to be compared to any number of threshold limits, such as an upper threshold limit, a lower threshold limit and/or intermediate threshold limits. For example, if one of the personnel changes a parameter value beyond the upper threshold limit, then such changes may be denied and/or prevented from being uploaded to the configuration database and one or more notification messages may be transmitted by the example upload manager 112 to alert other personnel of a potentially dangerous change. On the other hand, if one of the personnel changes a parameter value beyond an intermediate threshold limit that is still below an upper (or above a lower) limit, then the example upload manager 112 may allow/permit such changes to be uploaded to the configuration database.

When a user completes one or more changes to action drop-down boxes for one or more personnel types 328 and/or one or more parameters in the parameter column 326, then a matched pair between the personnel classification and the upload action is established. Any number of matched pairs may be designated and/or otherwise established via the example action drop-down boxes. To save any arrangement and/or combination of matched pairs, the user may enter a profile name in a profile name text box 338 and save the profile name by clicking on a save profile button 340. On the other hand, in the event that the user wishes to load a previously saved profile, then the user may select a profile name drop-down box 342, make a selection of a saved profile, and select a load profile button 344 to apply the selected profile to the parameters and corresponding personnel types 328.

FIG. 4 illustrates an example UI 400 generated by the example upload manager 112 to facilitate viewing and/or editing of one or more threshold values associated with the Conditional action (i.e., the conditional allow privilege). In the illustrated example of FIG. 4, the UI 400 includes a conditional parameters identification field 402 to inform the user of which parameter of interest will be evaluated in view of one or more conditional threshold values. The example UI 400 also includes an upper threshold field 404, a first intermediate threshold field 406, a second intermediate threshold field 408, and a lower threshold field 410. Each threshold field includes a corresponding units field in a units column 412 and a corresponding action drop-down box in an action column 414. Actions that the user may select from the action drop-down boxes include, but are not limited to a deny-if-above action, a deny-if-below action, an allow-if-above action, and an allow-if-below action. Additionally, each threshold row includes an associated notification check-box 416 to facilitate notification if a row condition is deemed true. If notification for any particular row is selected, then one or more contact entities may be alerted with one or more messages. The illustrated example UI 400 of FIG. 4 includes a contact information column 418 and a message column 420 for two example contact entities (i.e., Contact Entity #1 422 and Contact Entity #2 424).

In operation, the example condition manager 206 evaluates a parameter value change initiated by one of the personnel against each of the threshold values in the example UI 400 of FIG. 4. In the event that the personnel of interest changed a parameter value from 96 to 99, then the example upper threshold 404 of FIG. 4 will be exceeded, and the corresponding action causes the upload manager 112 to deny uploading this parameter value to the configuration database. Additionally, because the corresponding notification check-box 416 is selected, each of the contact entities will receive a message as identified in the corresponding message field of the message column 420. In another example, in the event that the personnel of interest changed a parameter value from 96 to 91, then the example first intermediate threshold 406 would be exceeded and the corresponding action causes the upload manager 112 to allow uploading this value to the configuration database. When the user is finished viewing and/or editing one or more fields of the example UI 400, an exit without changes button 426 may be selected, or a save and exit button 428 may be selected.

Figure 5A:
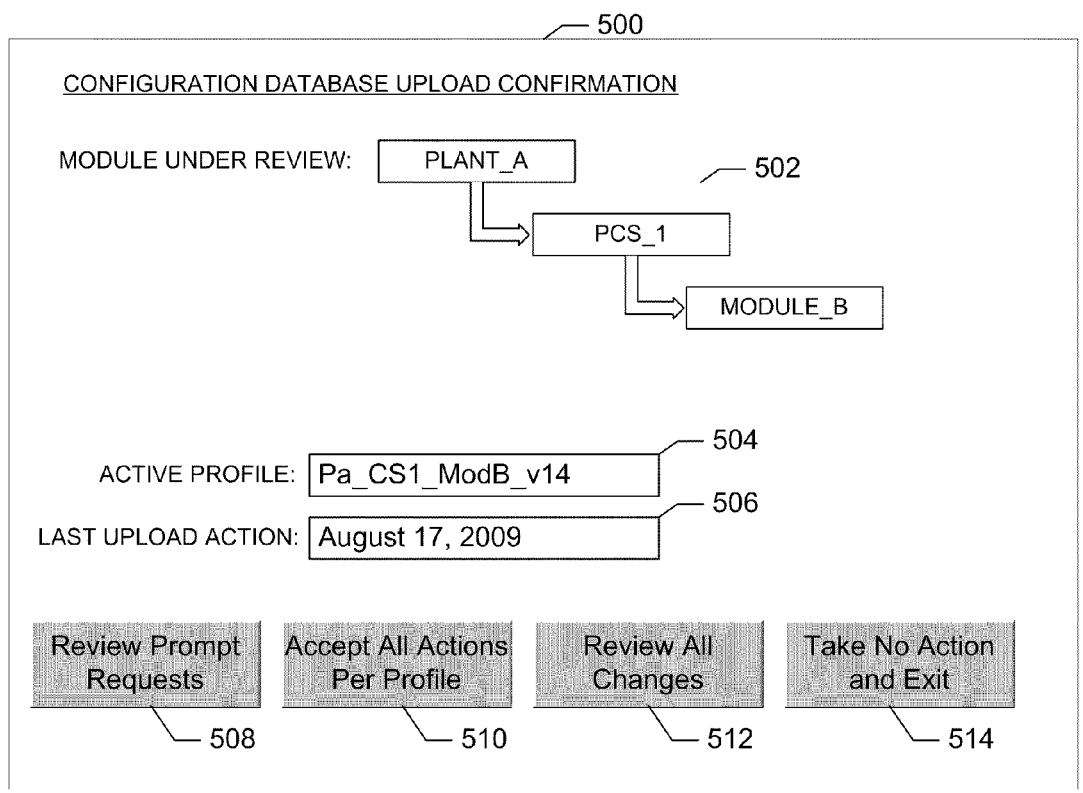

Turning to FIG. 5A, an example UI 500 may be generated by the example upload manager 112 prior to updating the example configuration database 110 with changed parameter values stored in one or more runtime databases, such as the example runtime database 124 of FIG. 1. As described above, the configuration engineer may be responsible for ensuring that any changes made to the configuration database are authorized, proper and/or do not corrupt the configuration database. As such, the configuration engineer (and/or any other employee/personnel having a similar responsibility) may periodically, aperiodically, manually and/or on a scheduled basis review candidate changes of parameter values that may be uploaded from one or more runtime databases in the process control environment 100 to the example configuration database 110. In operation, the example upload manager 112 generates the example UI 500 to include a module identifier field 502, an active profile indication field 504, and a date field 506 to identify the last date in which module data was updated on the configuration database 110. Additionally, the example UI 500 includes a review prompt requests button 508, an accept all actions per profile button 510, a review all changes button 512, and a take no action and exit button 514.

In the event that the example configuration engineer selects the review prompt requests button 508, then the example upload manager 112 generates a prompt request UI 520, as shown in FIG. 5B. In the illustrated example of FIG. 5B, the prompt request UI 520 includes an enable column 522, a parameter description column 524, a previous value column 526, a current value column 528, a select all button 530, a deselect all button 532, and an apply button 534. The example prompt request UI 520 includes any number of rows of parameters that correspond to changed parameter values that are associated with the prompt-for-review upload action. Any checked row in the enable column 522 will result in that corresponding parameter value being uploaded from the runtime database 124 to the configuration database 110 when the apply button 534 is selected. Additionally, for all rows that do not have a corresponding check in the enable column 522 will prevent and/or otherwise disable any update from the runtime database 124 to the configuration database 110 for the parameter value of the corresponding row. In an effort to allow the configuration engineer to appreciate potential differences between the runtime database 124 parameter values and the values stored in the configuration database 110, the example UI 520 previous value column 526 and the current value column 528 permit any user to identify corresponding magnitudes and/or units associated with the change(s).

In the event that the example configuration engineer selects the review all changes button 512, then the example upload manager 112 generates an all changes UI 536, as shown in FIG. 5C. In the illustrated example of FIG. 5C, the all changes UI 536 includes an enable column 538, a parameter description column 540, a previous value column 542, a current value column 544, a change authorization column 546, a date changed column 548, a select all button 550, a deselect all button 552, and an apply button 554. Unlike the example prompt request UI 520 of FIG. 5B, the example all changes UI 536 of FIG. 5C provides the configuration engineer with a complete list of parameter values that are different when compared between the runtime database 124 and the configuration database 110.

While an example process control environment 100 has been shown to facilitate managing data uploading, and an example upload manager 112 has been illustrated in FIGS. 1 and 2, one or more of the interfaces, data structures, elements, processes, UIs and/or devices illustrated in FIGS. 1 through 4, 5A, 5B and 5C may be combined, divided, re-arranged, omitted, eliminated and/or implemented in any other way. Further, the example configuration database 110, upload manager 112, controller 122, runtime database 124 and/or modules 126 of FIGS. 1 and 2 may be implemented by hardware, software and/or firmware. Thus, for example, any of the example configuration database 110, upload manager 112, controller 122, runtime database 124 and/or modules 126 may be implemented by one or more circuit(s), application specific integrated circuit(s) (ASIC(s)), programmable logic device(s) (PLD(s)), and/or field programmable logic device(s) (FPLD(s)), etc. Further still, an upload manager may include interfaces, data structures, elements, processes and/or devices instead of, or in addition to, those illustrated in FIGS. 1 and 2 and/or may include more than one of any or all of the illustrated interfaces, data structures, elements, processes, UIs and/or devices.

Figure 6A:
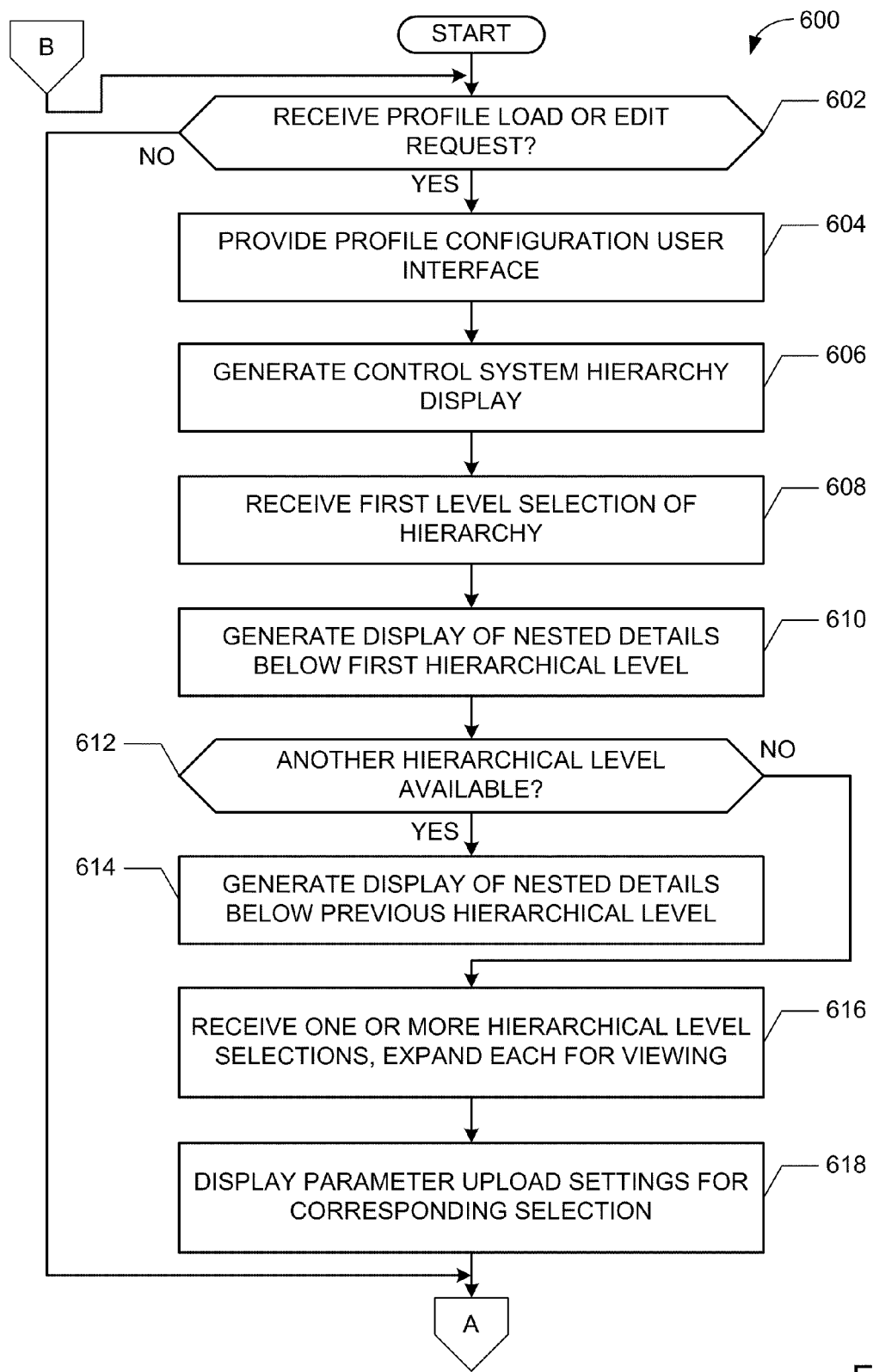
FIGS. 6A, 6B and 7 are flow diagrams of example methods that may be used to implement the example upload manager and UIs of FIGS. 1-4, 5A, 5B and 6.
Figure 6B:
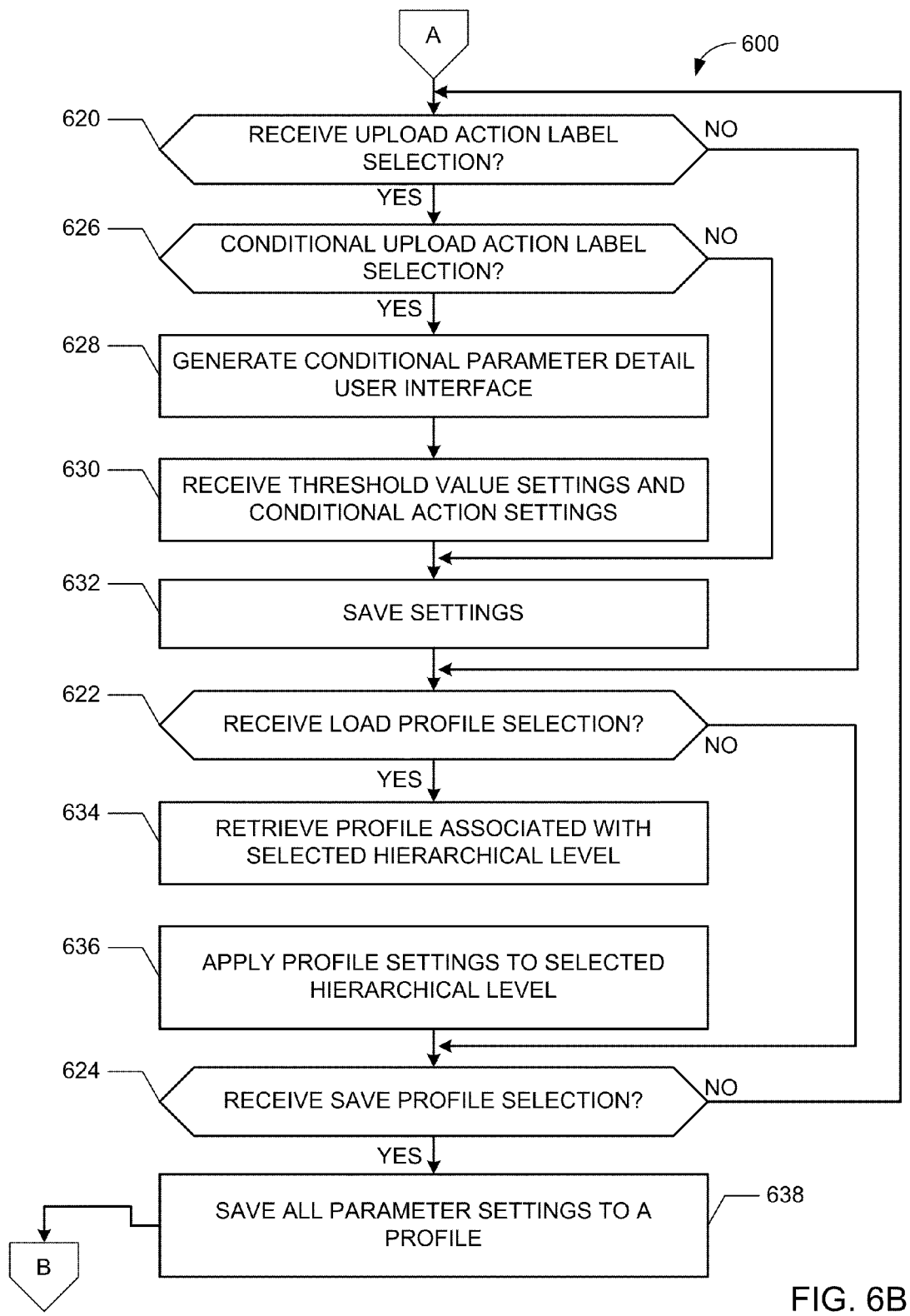
Figure 7:
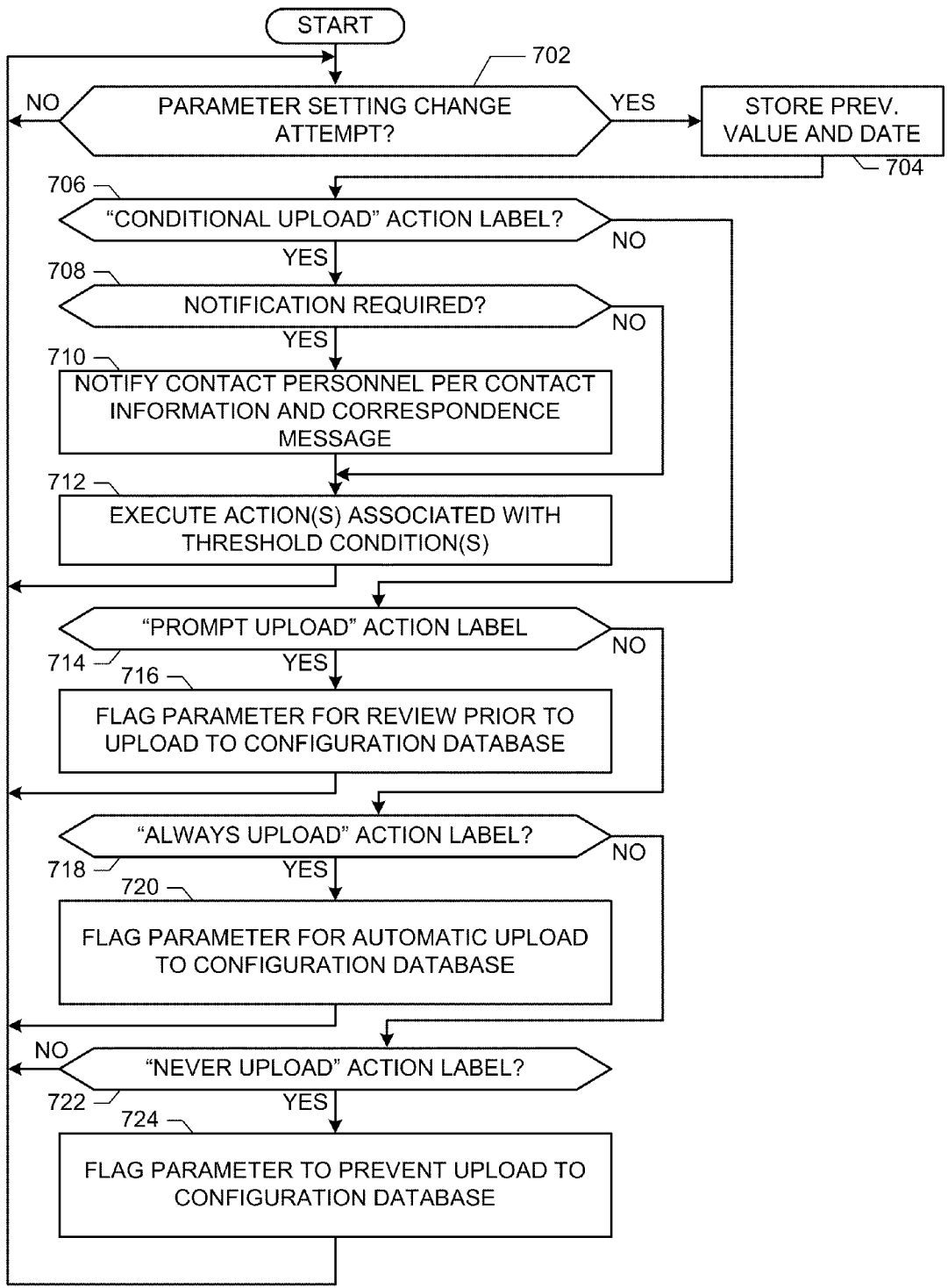

FIGS. 6A, 6B and 7 illustrate example processes that may be performed to implement the example process control environment 100 and upload manager 112 of FIGS. 1-4, 5A, 5B, and 5C. The example processes of FIGS. 6A, 6B and 7 may be carried out by a processor, a controller and/or any other suitable processing device. For instance, the example processes of FIGS. 6A, 6B and 7 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 8). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 6A, 6B and 7 may be implemented using any combination(s) of ASIC(s), PLD(s), FPLD(s), discrete logic, hardware, firmware, etc. Also, one or more operations of the example processes of FIGS. 6A, 6B and 7 may instead be implemented manually or as any combination of any of the foregoing techniques, for example, any combination of firmware, software, discrete logic, and/or hardware. Further, many other methods of implementing the example operations of FIGS. 6A, 6B and 7 may be employed. For example, the order of execution of the blocks may be changed, and/or one or more of the blocks described may be changed, eliminated, sub-divided, or combined. Additionally, any or all of the example processes of FIGS. 6A, 6B and 7 may be carried out sequentially and/or carried out in parallel by, for example, separate processing threads, processors, devices, discrete logic, circuits, etc.

The example process 600 of FIG. 6A begins with the upload manager 112 identifying whether a load or edit request is received (block 602). If not, then control advances to identify whether an upload action label has been selected, as described in further detail below. In the event of receiving a load or edit request (block 602), a profile setup UI is generated by the upload manager 112 (block 604), such as the example profile setup UI 300 of FIG. 3. To allow the configuration engineer (or any other authorized user of the upload manager 112) to view one or more PCSs of the example control environment 100, the example upload manager 112 generates a control system hierarchy display (block 606), such as the example primary-level hierarchical representation 302, the secondary-level hierarchical representation 310, and the tertiary-level hierarchical representation 318 illustrated in FIG. 3. As described above, while the illustrated example of FIG. 3 includes three hierarchical levels, any number of hierarchical levels may be generated by the example upload manager 112 based on, in part, PCS size, complexity and/or configuration.

A selection of the example primary-level hierarchical control system representation is received by the upload manager (block 608), which may correspond to one of any number of manufacturing plants. Without limitation, the example primary-level hierarchical control system representation may reflect any logical subgrouping of a PCS. Based on the selection of the primary-level hierarchical control system representation (block 608), the example upload manager 112 generates a display of nested details related to the primary-level representation (block 610). If another hierarchical level is available (block 612), then the example upload manager 112 generates another nested display to expose details related to one or more lower levels of the hierarchy (block 614). For example, if the primary-level representation of the hierarchy related to one or more manufacturing plants in which one or more PCSs operate therein, then a second-level representation of the hierarchy may further expose one or more details related to each PCS. The example upload manager 112 may iterate to identify any number of additional hierarchical levels (block 612) and generate one or more displays related thereto (block 614). While each hierarchical level may have any degree of detail, such detail may be maintained in a collapsed format to prevent inundating the user with substantial screen traffic.

When no additional hierarchical levels related to the control system environment 100 remain, the example upload manager 112 receives one or more hierarchical level selection (s) from the user (block 616). Expansion of additional level detail allows one or more specific aspects of the control system environment 100 to be viewed and/or edited (block 618) while minimizing screen clutter. For example, if the example upload manager 112 receives a selection related to a specific module within a specific PCS (e.g., a tertiary-level hierarchical representation, such as Module B 322 of FIG. 3), then parameter action settings will be displayed that correspond to an active profile, if any. In the event that the selected hierarchical representation does not have a configured profile, then default values may be shown (e.g., all inputs initiated by maintenance personnel never upload, all inputs initiated by configuration engineers always upload, all inputs initiated by engineers require a prompt before upload, etc.).

As shown in FIG. 6B, the example profile manager 202 monitors for receipt of an upload action label selection (block 620), which indicates that a user (e.g., a configuration engineer) is associating a parameter and a personnel-type with an upload action. However, if no action label selection is received, the example profile manager 202 monitors for receipt of a request to load a profile (block 622). Further, if no request to load a profile is received (block 622), the example profile manager 202 monitors for receipt of a request to save the current settings as a new profile (block 624). Generally speaking, the example profile manager 202 monitors for one or more of action label selections, requests to load previously saved profiles, and requests to save profiles for future use.

Returning to block 620, if an action label selection is received, the example condition manager 206 identifies whether the upload action type is associated with a conditional action (block 626). If so, then the condition manager 206 generates a UI to allow the user to input and/or edit threshold details to be associated with the parameter of interest and the personnel-type of interest (block 628). As described in connection with FIG. 4, threshold details, such as one or more threshold values, may be received (block 630) for any number of conditional thresholds including, but not limited to an upper threshold, a lower threshold and/or intermediate threshold(s). Such conditional threshold settings are saved (block 632) to the example condition database 208 for future comparison of one or more changed parameter values.

In the event that the example profile manager 202 receives a request to load a profile selection (block 622), then the profile manager 202 queries the example profile database 204 for a profile that matches a load query, such as a profile name retrieved from the example profile name drop-down box 342 of FIG. 3. The example profile manager 202 retrieves the profile that is associated with the selected hierarchical level (block 634), such as a currently selected tertiary-level hierarchical representation of Module_B. Profile settings stored in the example profile database 204 are retrieved and applied to one or more parameters associated with the selected hierarchical level (block 636). In the event that one or more parameter actions are changed and a request to save a profile is received (block 624), then the example profile manager 202 saves the current settings to the profile database 204 associated with a name entered into the example profile name text box 338 of FIG. 3 (block 638). Control returns to block 602 to determine whether one or more additional load, edit and/or action label selections are received.

Turning to FIG. 7, in addition to identifying one or more circumstances where a profile is loaded, edited and/or saved, the example upload manager 112 also monitors for instances in which one or more personnel attempt to change a parameter value (block 702) of a PCS. For example, one or more maintenance personnel 121 may access a PCS via the workstation 120 to make one or more parameter value changes that allow installation and/or replacement of PCS equipment (e.g., a transducer, a sensor, a pump, a heater, a motor, etc.). When one or more changes to a parameter value occur, the date on which the changes occur and the previous value(s) are stored (block 704). If the changed parameter is associated with a conditional upload action label (block 706), then the example condition manager 206 queries the condition database 208 to determine whether immediate notification is required (block 708). If so, the contact personnel associated with the currently changed parameter are contacted via the example communication interface 210 using contact information (e.g., telephone numbers, e-mail addresses, etc.) and corresponding messages (e.g., "Parameter x has just been altered by Maintenance personnel."), as shown in FIG. 4 (block 710). For circumstances in which notification is not required (block 708), one or more corresponding actions associated with the threshold conditions are executed (block 712).

In the event that a conditional upload action label is not associated with a recently changed parameter value (block 706), then the example upload manager 112 determines whether a prompt upload action label is associated with the recently changed parameter value (block 714). If so, then the example profile manager 202 flags the parameter for review prior to allowing the changed value(s) to be uploaded to the configuration database (block 716).

In the event that a prompt upload action is not associated with the recently changed parameter (block 714), then the example upload manager 112 determines whether an always upload action label is associated with the recently changed parameter value (block 718). If so, then the example profile manager 202 flags the parameter for automatic upload to the configuration database during any future upload review by the configuration engineer (block 720).

In the event that an always upload action is not associated with the recently changed parameter (block 718), then the example upload manager 112 determines whether a never upload action label is associated with the recently changed parameter value (block 722). If so, then the example profile manager 202 flags the parameter for no change during any future upload review by the configuration engineer (block 724). Control returns to block 702 to continue to monitor for one or more instances where a parameter value is changed.

Figure 8:
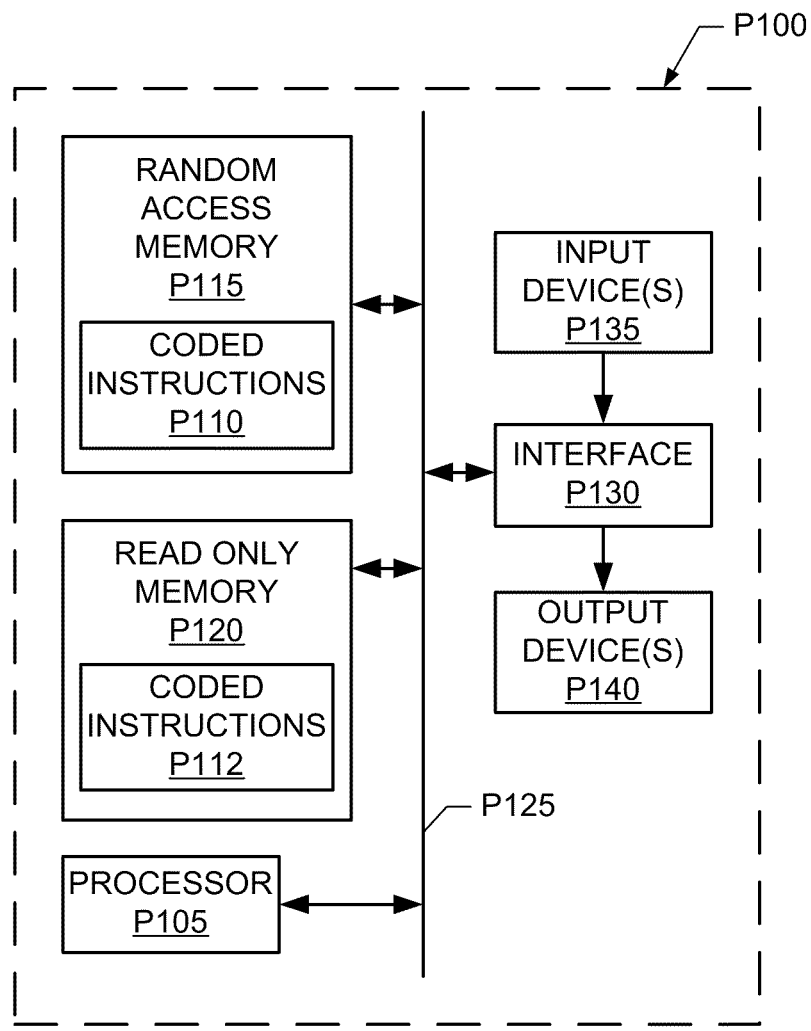
FIG. 8 is a schematic diagram of an example processor platform that may execute the example processes of FIGS. 6A, 6B and 7 and/or the example upload manager of FIGS. 1 and 2.

FIG. 8 is a schematic diagram of an example processor platform P100 that may be used and/or programmed to implement any or all of the example configuration database 110, upload manager 112, controller 122, runtime database 124 and/or modules 126 of FIGS. 1 and 2. For example, the processor platform P100 can be implemented by one or more general-purpose processors, processor cores, microcontrollers, etc.

The processor platform P100 of the example of FIG. 8 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 6A, 6B and 7 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example runtime database 124, the example profile database 204 and/or the example condition database 208 of FIGS. 1 and 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer-implemented method to upload a parameter value in a process control environment, comprising:
   retrieving an upload rule profile associated with a process control system (PCS) in response to receiving a request to upload a parameter value to a local database associated with the PCS and to a global database associated with a plurality of PCSs;
   identifying an upload action from the upload rule profile based on distinguishing a type of the parameter value as associated with one of PCS safety or not associated with PCS safety and a personnel classification;
   selecting the upload action of storing the parameter value in the local database associated with the PCS and in the global database associated with the plurality of PCSs when the type of the parameter value is not associated with PCS safety; and
   protecting the global database associated with the plurality of PCSs by (a) allowing storage of the parameter value in the local database associated with the PCS while (b) preventing storage of the parameter value in the global database associated with the plurality of PCSs when the type of the parameter value is associated with PCS safety.

2. The method as defined in claim 1, wherein the upload rule profile comprises a plurality of matched pairs between the upload action and the personnel classification.

3. The method as defined in claim 1, wherein the upload action comprises an always allow privilege to permit uploading of the parameter value.

4. The method as defined in claim 1, wherein the upload action comprises a never allow privilege to deny uploading of the parameter value.

5. The method as defined in claim 1, wherein the upload action comprises a prompt request to invoke an indication of authorization prior to uploading the parameter value.

6. The method as defined in claim 1, wherein the upload action comprises a conditional allow privilege to compare a change of the parameter value with a threshold prior to uploading the parameter value.

7. The method as defined in claim 6, wherein the threshold comprises at least one of an upper threshold, a lower threshold, or an intermediate threshold.

8. The method as defined in claim 7, further comprising preventing the upload of the parameter value when a change of the parameter value is above the upper threshold.

9. The method as defined in claim 7, further comprising preventing the upload of the parameter value when a change of the parameter value is below the lower threshold.

10. The method as defined in claim 1, wherein the parameter value associated with PCS safety comprises at least one of a pressure limit, a temperature limit, a pump disconnect signal or a heater disconnect signal.

11. An apparatus to upload a parameter value in a process control environment, comprising:
    an upload manager to receive a request to upload a parameter value to a local database associated with a process control system (PCS) and to a global database associated with a plurality of PCSs;
    a database change monitor to identify a change in the parameter value as associated with one of PCS safety or not associated with PCS safety;
    a profile manager to retrieve an upload rule profile associated with the process control system and to select an upload action from the upload rule profile based on type of the parameter value and a personnel classification, the profile manager to select the upload action of storing the parameter value in the local database associated with the PCS and in the global database associated with the plurality of PCSs when the type of the parameter value is not associated with PCS safety, and to protect the global database associated with the plurality of PCSs by allowing storage of the parameter value in the local database associated with the PCS while preventing storage of the parameter value in the global database associated with the plurality of PCSs when the type of the parameter value is associated with PCS safety, at least one of the upload manager, the database change monitor, or the profile manager comprising a logic circuit.

12. The apparatus as defined in claim 11, further comprising a condition manager to allow an upload of the parameter value based on a comparison between a change value of the parameter value and a threshold value.

13. The apparatus as defined in claim 12, further comprising a condition database to provide the threshold value.

14. The apparatus as defined in claim 11, wherein the selected upload action comprises an always allow privilege to permit uploading of the parameter value.

15. The apparatus as defined in claim 11, wherein the selected upload action comprises a never allow privilege to deny uploading of the parameter value.

16. The apparatus as defined in claim 11, wherein the parameter value associated with PCS safety comprises at least one of a pressure limit, a temperature limit, a pump disconnect signal or a heater disconnect signal.

17. A machine readable storage device or storage disc having instructions stored thereon that, when executed, cause a machine to at least:
    retrieve an upload rule profile associated with a process control system (PCS) in response to receipt of a request to upload a parameter value to a local database associated with the PCS and to a global database associated with a plurality of PCSs;
    identify an upload action from the upload rule profile based on distinguishing a type of the parameter value as associated with one of PCS safety or not associated with PCS safety and a personnel classification;
    select the upload action of storing the parameter value in the local database associated with the PCS and in the global database associated with the plurality of PCSs when the type of the parameter value is not associated with PCS safety; and
    protect the global database associated with the plurality of PCSs by (a) allowing storage of the parameter value in the local database associated with the PCS while (b) preventing storage of the parameter value in the global database associated with the plurality of PCSs when the type of the parameter value is associated with PCS safety.

18. The machine readable storage device or storage disc as defined in claim 17, wherein the machine accessible instructions, when executed, cause the machine to permit uploading of the parameter value via an always allow privilege.

19. The machine readable storage device or storage disc as defined in claim 17, wherein the machine accessible instructions, when executed, cause the machine to deny uploading of the parameter value via a never allow privilege.

20. The machine readable storage device or storage disc as defined in claim 17, wherein the machine accessible instructions, when executed, cause the machine to compare a change of the parameter value with a threshold prior to uploading the parameter value.

21. The machine readable storage device or storage disc as defined in claim 20, wherein the machine accessible instructions, when executed, cause the machine to prevent the upload of the parameter value when a change of the parameter value is above an upper threshold.

22. The machine readable storage device or storage disc as defined in claim 17, wherein the parameter value associated with PCS safety comprises at least one of a pressure limit, a temperature limit, a pump disconnect signal or a heater disconnect signal.

* * * * *